(12) United States Patent
Nakano

(10) Patent No.: US 6,226,019 B1
(45) Date of Patent: May 1, 2001

(54) IMAGING FORMING APPARATUS FOR FORMING AN IMAGE BY DIGITAL PROCESSING

(75) Inventor: Masao Nakano, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/215,189

(22) Filed: Dec. 18, 1998

(30) Foreign Application Priority Data

Dec. 26, 1997 (JP) .................................................. 9-359006

(51) Int. Cl.⁷ .............................. B41J 2/385; G03G 13/04
(52) U.S. Cl. .............................................. 347/131; 358/448
(58) Field of Search ...................................... 347/129, 131; 358/448, 455, 456, 457, 458, 461, 464

(56) References Cited

U.S. PATENT DOCUMENTS

| | | | |
|---|---|---|---|
| 4,894,729 | * | 1/1990 | Murayama et al. ............... 358/448 X |
| 5,486,927 | * | 1/1996 | Koizumi et al. .................. 347/131 X |
| 5,640,191 | * | 6/1997 | Zulian et al. ..................... 347/131 X |
| 5,818,971 | * | 10/1998 | Moolenaar et al. .............. 358/456 X |
| 6,016,206 | * | 1/2000 | Koide et al. ...................... 347/131 X |

* cited by examiner

Primary Examiner—Sandra Brase
(74) Attorney, Agent, or Firm—Fitzpatrick, Cella, Harper & Scinto

(57) ABSTRACT

This specification discloses an electrophotographic apparatus for forming an image by digital processing improved in a gradation property, provided with image data processing means for processing input image data to the apparatus body into data for forming an electrostatic latent image, electrostatic latent image forming means for effecting image exposure by digital optical means conforming to the electrostatic latent image data to thereby form the electrostatic latent image on the electrophotographic photosensitive member, and developing means for developing the electrostatic latent image with a toner to thereby form a developed image, wherein the image data processing means effects an image calculation taking into account the mutual action around a pixel constituting the electrostatic latent image in conformity with the size of the pixel when it processes the input image data into the electrostatic latent image data.

5 Claims, 15 Drawing Sheets

| 1 | 8 | 3 | 11 |
|---|---|---|---|
| 12 | 4 | 15 | 7 |
| 5 | 13 | 2 | 10 |
| 16 | 9 | 14 | 6 |

FIG. 24A

|   |     |     |   |
|---|-----|-----|---|
|   | 1/2 | 1/2 |   |
|   | 1/2 | 1/2 |   |
|   |     |     |   |

FIG. 24B

|   |   |   |   |
|---|---|---|---|
|   | 1 | 1 |   |
|   | 1 | 1 |   |
|   |   |   |   |

FIG. 24C

|     | 1/4 | 1/4 |     |
|-----|-----|-----|-----|
| 1/4 | 1   | 1   | 1/4 |
| 1/4 | 1   | 1   | 1/4 |
|     | 1/4 | 1/4 |     |

FIG. 24D

|     | 1/2 | 1/2 |     |
|-----|-----|-----|-----|
| 1/2 | 1   | 1   | 1/2 |
| 1/2 | 1   | 1   | 1/2 |
|     | 1/2 | 1/2 |     |

FIG. 24E

|     | 3/4 | 3/4 |     |
|-----|-----|-----|-----|
| 3/4 | 1   | 1   | 3/4 |
| 3/4 | 1   | 1   | 3/4 |
|     | 3/4 | 3/4 |     |

FIG. 25

| 1  | 9  | 3  | 11 |
|----|----|----|----|
| 13 | 5  | 15 | 7  |
| 4  | 12 | 2  | 10 |
| 16 | 8  | 14 | 6  |

IMAGING FORMING APPARATUS FOR FORMING AN IMAGE BY DIGITAL PROCESSING

BACKGROUND OF THE INVENTION

1. Field of the Invention

This invention relates to an image forming apparatus such as a copying apparatus or a printer for effecting image formation by an electrophotographic system, and particularly to an image forming apparatus for effecting image density processing by digital processing.

2. Related Background Art

In the image formation by an electrophotographic system, various systems have heretofore been adopted to obtain gradation images. The developing process by an image forming apparatus according to the prior art has the characteristic that low density portions are liable to be blown off and high density portions are liable to be crushed, and usually images formed by the electrophotographic system are liable to become contrasty. Also, the technique of attempting the reproduction of halftone by adjusting the potential contrast which is the potential difference between the image portion and non-image portion of an electrostatic latent image formed on an image bearing member is generally widely known.

Now, in a digital electrophotographic system wherein an image reading portion for introducing input image data and an image forming portion (image writing-in portion) for forming an image conforming to the input image data are made independent of each other and an image signal read by the image reading portion is digital-processed and sent to the image forming portion, there is known a method of making image data while referring to a table for correcting an input-output characteristic, and the preservation of macroscopic image density is possible.

Generally, a density correction table is made as the reverse characteristic of the output characteristic of the image forming portion. That is, stepwise output data are sent to the image forming portion, the density of an outputted image is measured, and the value of image data for obtaining predetermined density is found conversely.

Also, when for a pixel, gradation expression is done by the use of an area gradation method or an intensity gradation method, data for reproducing the density of a predetermined pixel in the read image density data are sent to the image forming portion to thereby effect the reproduction of image density.

Image density is generally measured as the density of a uniform image of a certain size, and usually it is often within a range of several millimeters to several centimeters.

In the prior-art image forming apparatus described above, however, when image density processing is effected by digital processing, the mutual action between pixels is great and the density of a certain marked pixel is changed by the data around that pixel and it becomes impossible to effect good density control. Particularly in recent years, as the image forming apparatus becomes higher in resolution, the density interference between pixels becomes more liable to occur.

Some specific examples of the prior-art image density control will hereinafter be described with reference to FIGS. 25 to 29 of the accompanying drawings.

FIG. 25 shows a bayar pattern of 4×4 pixel dithers, and this pattern is directed to smear away the pixels in the order of numbers to thereby effect area gradation control and obtain a linear gradation property. FIG. 26 shows the actually measured image density when this area gradation control is applied to the electrophotographic system. The gradation property in this case becomes actually not linear, and the reversal of density is caused.

FIG. 27 typically represents the surface potential distribution of an image bearing member (photosensitive drum) of dither bayar pattern gradation 4 by a simulation. In such a simulation, there are shown the average potential (a), the lowest potential (b) and the highest potential (c) of the image bearing member (photosensitive drum) at each level (gradation). FIG. 29 shows the result of the measurement of the potential difference between the lowest potential and the highest potential of a pixel at each level (gradation), i.e., the contrast between pixels.

Thus, it will be seen that the reversal of image density is caused by the non-linearity of the contrast between pixels by the interference between the pixels.

Also, such partial reversal of image density becomes remarkable phenomenon by forming a minute electrostatic latent image to improve the property of the image, and using a toner of a small diameter (the average diameter being 8 to 6 $\mu$m).

Also, the measurement or electrolytic measurement of the potential distribution of the latent image in a minute area for confirming such an effect is nearly impossible from the measured size and therefore, it was impossible even to obtain data for studies.

SUMMARY OF THE INVENTION

It is the object of the present invention to provide an image forming apparatus which can obtain a high gradation property taking the interference between pixels into account.

The present invention which achieves the above object is an electrophotographic apparatus for forming an image by digital processing, provided with an electrophotographic photosensitive member bearing a formed electrostatic latent image thereon, image data processing means for processing input image data to the apparatus body into data for forming the electrostatic latent image, electrostatic latent image forming means for effecting image exposure by digital optical means conforming to the electrostatic latent image data to thereby form the electrostatic latent image on the electrophotographic photosensitive member, and developing means for developing the electrostatic latent image with a toner to thereby form a developed image, wherein the image data processing means effects an image calculation taking into account the mutual action around a pixel constituting the electrostatic latent image in conformity with the size of the pixel when it processes the input image data into the electrostatic latent image data.

BRIEF DESCRIPTION OF THE DRAWINGS

FIGS. 24A, 24B, 24C, 24D and 24E show image patterns in Embodiment 3.

FIG. 25 shows an example of the bayar pattern of 4×4 pixel dithers.

DESCRIPTION OF THE PREFERRED EMBODIMENTS

Some embodiments of the present invention will hereinafter be described with reference to the drawings.

[Embodiment 1]

Figure 1:
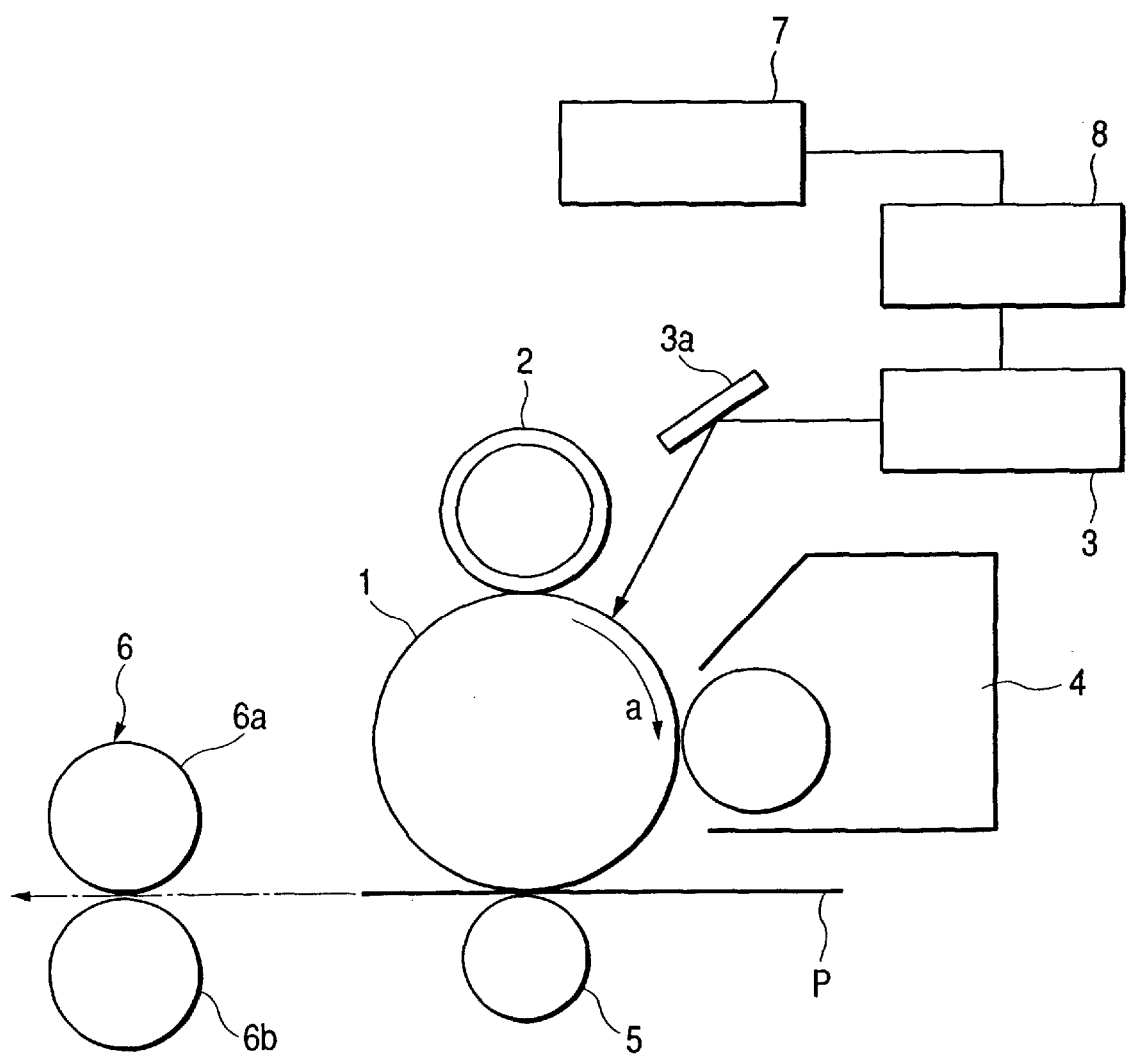
FIG. 1 schematically shows the construction of an image forming apparatus according to Embodiment 1 of the present invention.

FIG. 1 schematically shows the construction of an image forming apparatus according to Embodiment 1 (in the present embodiment, a copying apparatus for effecting digital image density processing).

In this figure, the reference numeral 1 designates a rotatable drum type electrophotographic photosensitive member (hereinafter referred to as the photosensitive drum) as an image bearing member bearing an electrostatic latent image thereon, the reference numeral 2 denotes a charging roller, the reference numeral 3 designates a digital exposure device such as a laser optical system which is electrostatic latent image forming means, the reference numeral 4 denotes a developing device using a toner, the reference numeral 5 designates a transfer roller, the reference numeral 6 denotes a heating and fixating device, the reference numeral 7 designates an image reading apparatus (image scanner apparatus), and the reference numeral 8 denotes an image data processing apparatus.

In the present embodiment, the photosensitive drum 1 has an organic photosensitive layer on a drum base body of aluminum which is a negatively charged organic photosensitive member (OPC photosensitive member), is rotatively driven in the direction of arrow a (clockwise direction) at a predetermined process speed, and is subjected to a uniform charging process of the negative polarity by the charging roller 2 in the process of rotation thereof. In the present embodiment, the outer diameter φ of the photosensitive drum 1 is 80 mm, and the film thickness of the photosensitive layer thereof is 30 μm.

The charging roller 2 bears against the surface of the photosensitive drum 1 with a predetermined pressure force and is rotated, and a predetermined charging bias is applied from a charging bias voltage source (not shown) to the charging roller 2 to thereby charge the photosensitive drum to uniform potential with a predetermined polarity.

In the present embodiment, the exposure device 3 has a scanning optical system (not shown) using a semiconductor laser of a wavelength of 680 nm, and effects exposure by a laser beam on the photosensitive drum 1 charged through a reflecting mirror 3a in conformity with an inputted image signal to thereby form an electrostatic latent image. Also, a laser spot system is 60 μm (main scanning)×80 μm (sub-scanning) for $1/e^2$, and image formation has been effected with the resolution on the photosensitive drum 1 being 600 dpi.

In the present embodiment, the developing device 4 in a non-contact one-component developing device, and the toner used therein in a non-magnetic one-component toner of which the average charging is 25 μc/g and the average particle diameter is 7.5 μm. Also, as the developing bias, use was made of a bias comprising an AC bias superposed on a DC bias.

The transfer roller 5 bears against the surface of the photosensitive drum 1 with a predetermined pressure force and is rotated, and a bias of the polarity opposite to that of the toner is applied for transfer thereto from a transfer bias voltage source (not shown).

The fixating device 6 has a fixating roller 6a containing a halogen heater (not shown) therein, and a pressing roller 6b rotated while being urged against the fixating roller 6a, and heats and presses a transfer material P such as paper having a toner image transferred thereto and conveyed to between the fixating roller 6a and the pressing roller 6b to thereby fixate the toner image on the transfer material P.

The image reading apparatus 7 scans and reads an original placed on an original glass table, not shown, and converts the image data of the read original into a digital electrical signal.

The image data processing apparatus 8 converts the input image data inputted from the image reading apparatus 7 into a digital signal, and thereafter converts it into an image signal of gradation proportional to image density, thereby forming electrostatic latent image data outputted to the exposure device 3 (the details of this will be described later).

Description will now be made of the image forming operation of the image forming apparatus described above.

During image formation, the photosensitive drum 1 in rotatively driven at a predetermined process speed in the direction of arrow a by driving means (not shown), and is subjected to a uniform charging process of the negative polarity by the charging roller 2 to which a charging bias has been applied. In the present embodiment, the photosensitive drum 1 was charged until it uniformly became a surface potential of −650 V.

Exposure by a laser beam is given to the charged surface of the photosensitive drum from the exposure device 3 via a reflecting mirror 3a, whereby there is formed an electrostatic latent image conforming to electrostatic latent image data inputted from the image data processing apparatus 8. The laser beam of the exposure device 3 at this time in such laser power that when it is fully turned on, the surface potential of the photosensitive drum 1 becomes −100 V.

Then, the electrostatic latent image is developed and visualized as a toner image by the developing device 4 to which a developing bias (in the present embodiment, a bias comprising an AC voltage having a peak-to-peak voltage of 2000 V and a frequency of 2000 Hz, superposed on a DC voltage of 550 V) is applied.

When the toner image on the surface of the photosensitive drum 1 arrives at the transfer nip between the transfer roller 5 and the photosensitive drum 1, a transfer material P is conveyed to this transfer nip in timed relationship therewith, and the toner image is transferred to the transfer material P by the transfer roller 5 to which a transfer bias is applied. The transfer material P to which the toner image has been transferred is conveyed to the fixating device 6, where the transferred toner image is fixated as a permanently fixated image on the transfer material P by the pressing by the pressing roller 6b and the heating by a halogen heater (not shown), and the transfer material P is outputted.

Description will now be made of the image density correcting process of the image data calculating device 8 for processing image data inputted from the image reading apparatus 7 into electrostatic latent image data.

Figure 2:
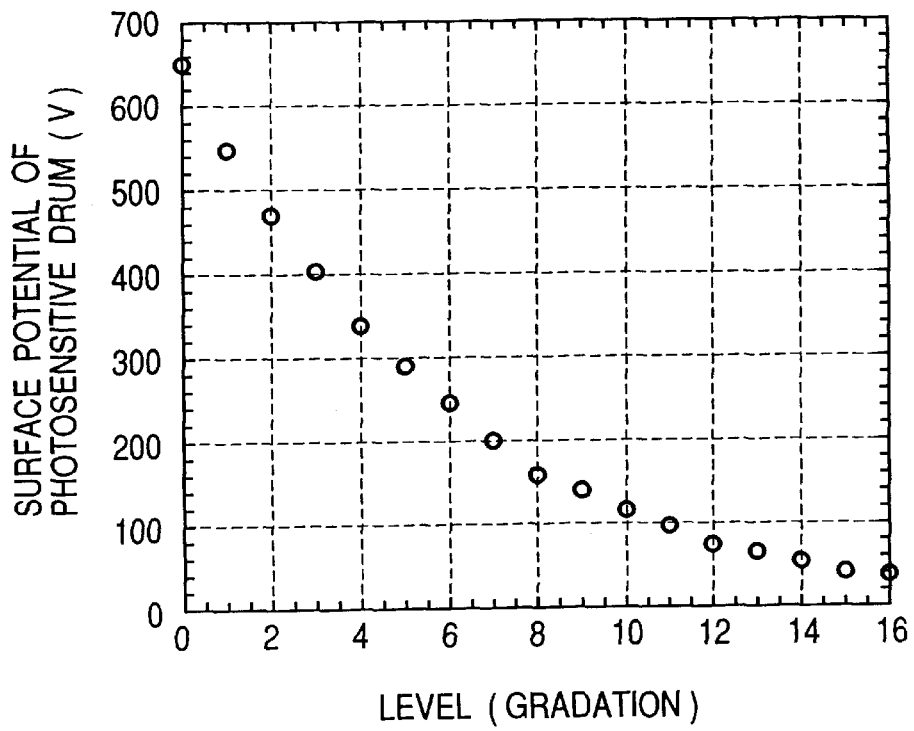
FIG. 2 is a graph showing the surface potential of a photosensitive drum at each gradation (level) obtained in an experiment in Embodiment 1.
Figure 3:
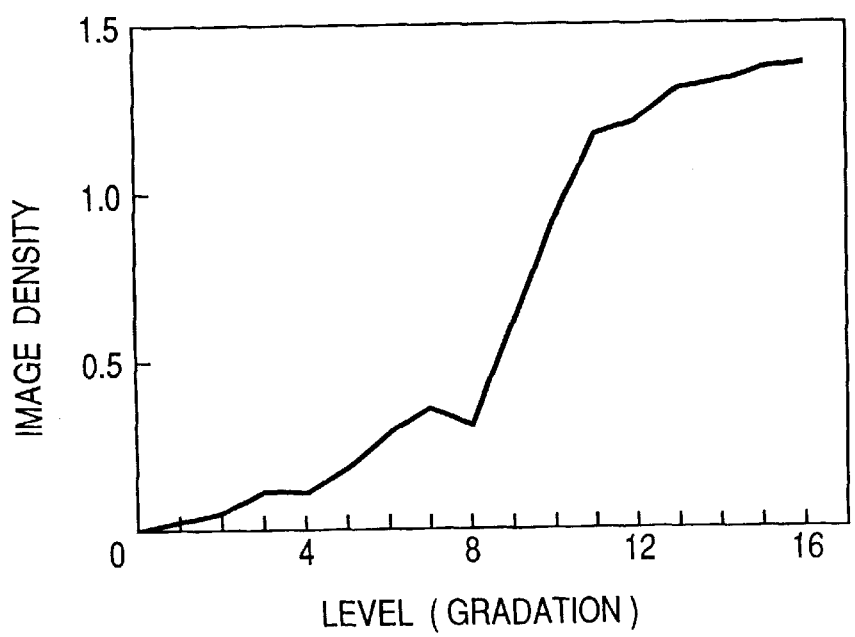
FIG. 3 is a graph showing image density (contrast) at each gradation (level) obtained in the experiment in Embodiment 1.

FIGS. 2 and 3 show the surface potential of the photosensitive drum and the image density (contrast) after development, respectively, at each gradation (level) obtained in an experiment, and from a view of the average potential, there ought to be a next correlation between the surface potential data and image density of the photosensitive drum. However, as described above, in the image density (contrast) data, reverse development partially happens at several gradation (levels).

Therefore, in the present embodiment, the image density was found by simulating the electrostatic latent image formed on the photosensitive drum 1 by the image data processing apparatus 8 so that from the simulation, the image forming pattern may be corrected.

Figure 4:
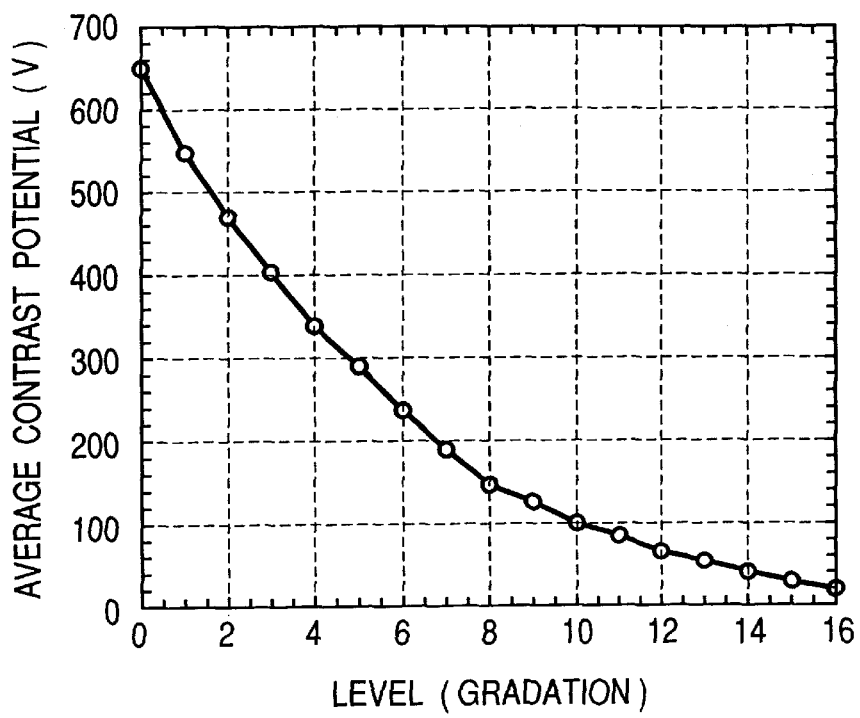
FIG. 4 is a graph showing the average contrast potential by a simulation when a gradation pattern is formed by a bayar type dither system in Embodiment 1.
Figure 5:
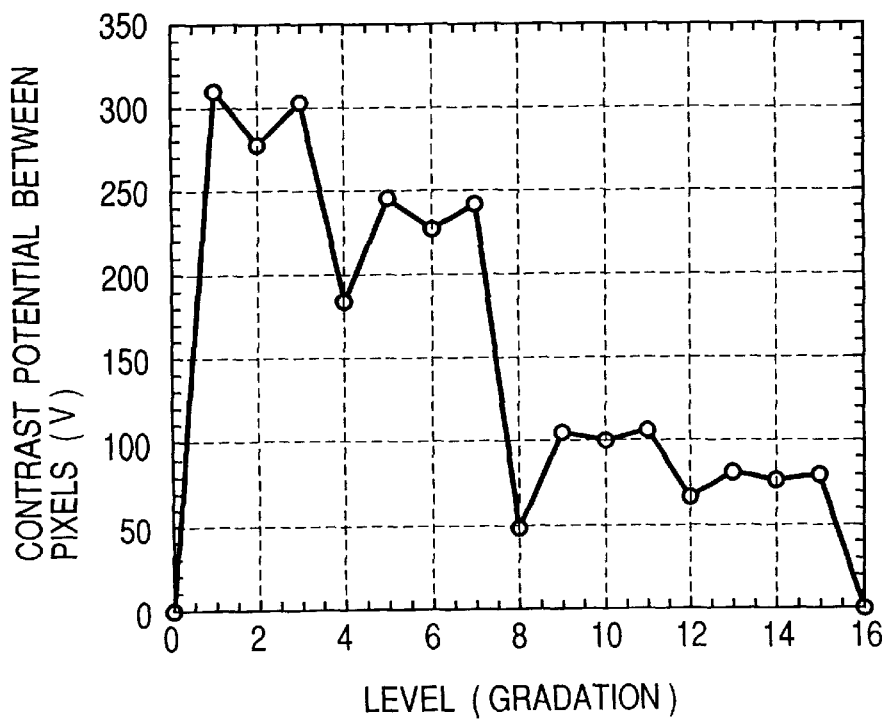
FIG. 5 is a graph showing the contrast potential between pixels by the simulation when a gradation pattern is formed by the bayar type dither system in Embodiment 1.

FIGS. 4 and 5 show the average contrast potential (FIG. 4) which is the difference between the DC value of the developing bias and the average value of the surface potential of the photosensitive drum 1 when a gradation pattern has been formed by the bayar type dither system, and the contrast potential between pixels (FIG. 5) which is the potential difference between the lowest potential and the highest potential of a pixel. Each of these contrasts (image densities) is a value found by the image formation simulation by the following procedure.

Figure 6:
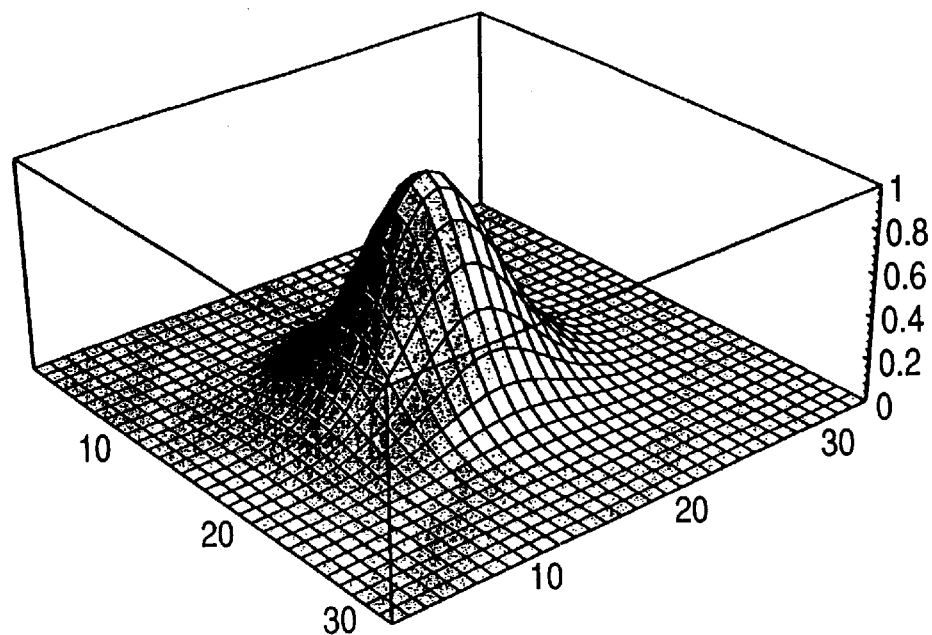
FIG. 6 shows an example of the energy distribution of a laser beam emitted from an exposure device.
Figure 7:
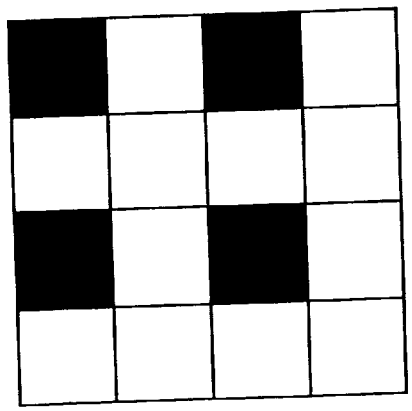
FIG. 7 shows an example of input image data inputted from an image reading apparatus to an image data processing apparatus.
Figure 8:
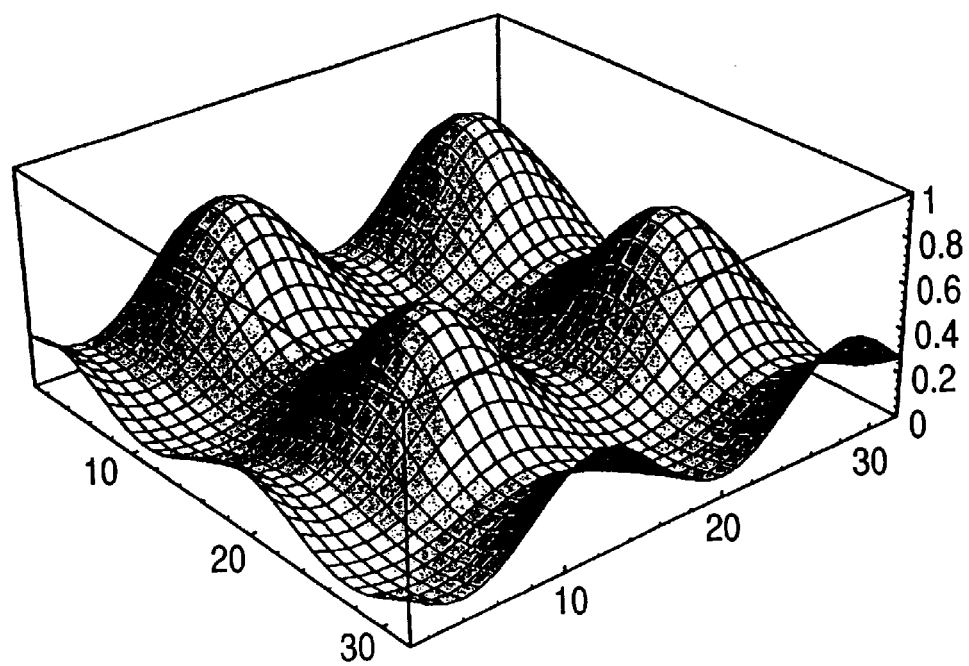
FIG. 8 shows an example of an exposure light amount distribution simulated by the image data processing apparatus.
Figure 9:
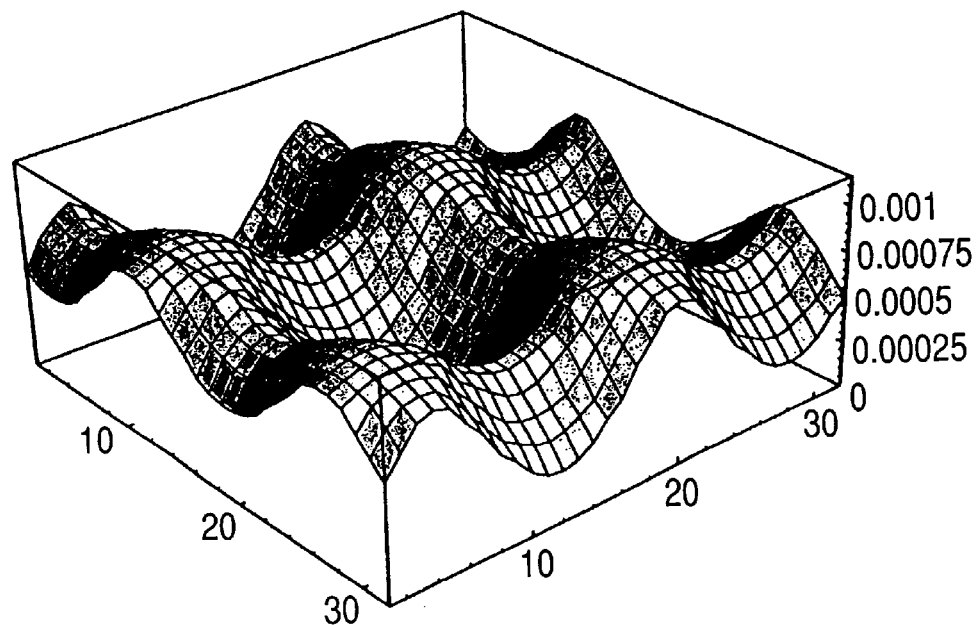
FIG. 9 shows an example of the surface charge density distribution of a photosensitive drum simulated by the image data processing apparatus.
Figure 10:
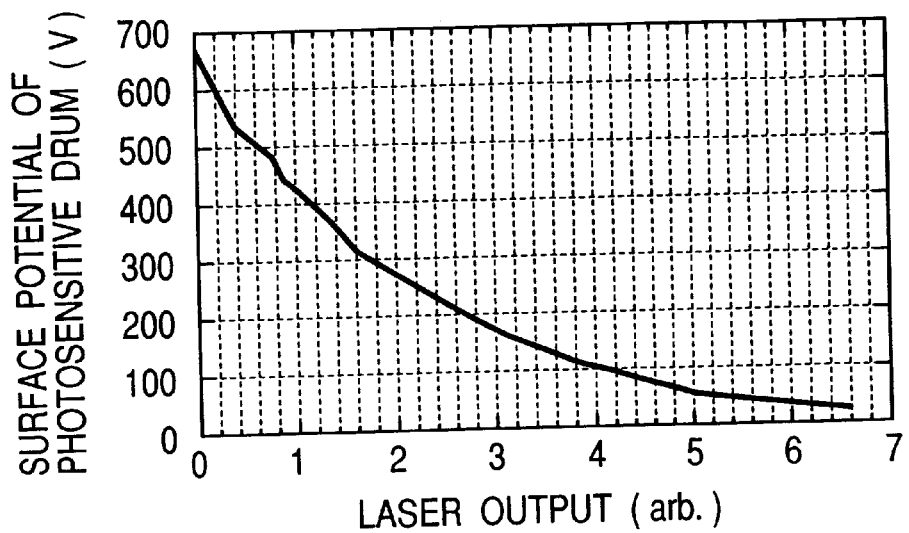
FIG. 10 is a graph showing the exposure characteristic curve of the photosensitive drum to a laser output.

Here, describing a gradation pattern as an example, an exposure light amount distribution (see FIG. 8) is simulated (calculated) by the image data processing apparatus 8 from the energy distribution (see FIG. 6) of a laser beam emitted from the exposure device 3 and input image data (see FIG. 7). From this simulated exposure light amount distribution, the surface charge density distribution (see FIG. 9) of the photosensitive drum 1 after exposed is simulated by the image data processing apparatus 8. FIG. 10 shows the exposure characteristic curve of the photosensitive drum 1 to the laser output, and by the use of this exposure characteristic curve, the image data processing apparatus 8 simulates the surface charge density distribution of the photosensitive drum 1.

Figure 11:
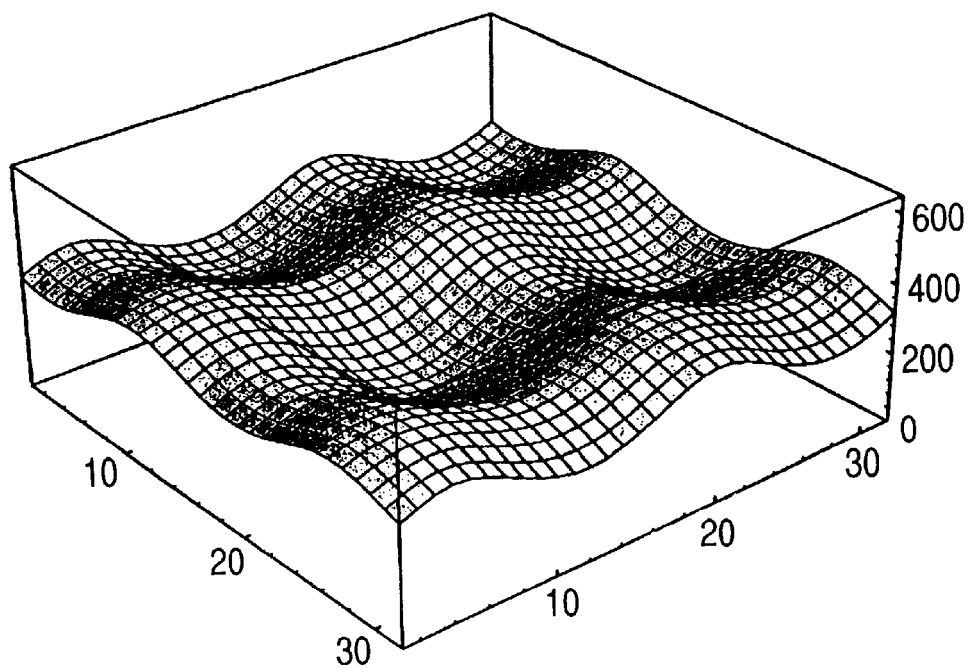
FIG. 11 shows an example of a potential distribution found from the surface charge density distribution simulated by the image data processing apparatus.

Then, from this simulated surface charge density distribution, a potential distribution (see FIG. 11) is simulated by the image data processing apparatus 8. In this case, the Fourier series method using an analytic solution was used for the simulation of the exposure distribution and the potential distribution. Also, in the simulation of the potential distribution, use may be made of a numerical value calculating method such as the finite element method or the boundary element method.

Also, the data of the average value, the highest value and the lowest value of the surface potential of the photosensitive drum 1 in this 4×4 matrix are inputted to the image data processing apparatus 8.

It will thus be seen that when the bayar type dither is applied to electrophotography, as shown in FIG. 5, an extreme reduction in the contrast potential between pixels is seen at a particular gradation (level).

When the result of the experiment shown in FIG. 2 is compared with the result of this simulation, it is seen that there is secured a good correlation between the both average contrast potential data. It is further seen that the reversed portion of the image density shown in FIG. 3 which was measured in the experiment coincides with the singular point of the contrast potential between pixels shown in FIG. 5 which was obtained in the above-described simulation.

Figure 12A:
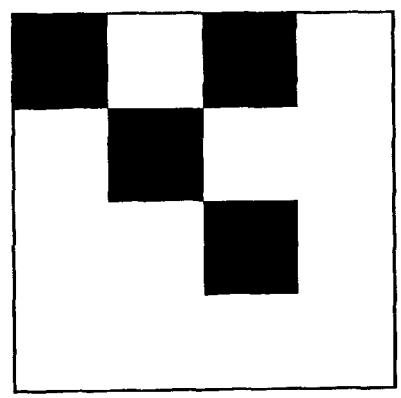
FIGS. 12A, 12B and 12C show examples of the image pattern adopted by the simulation.
Figure 12B:
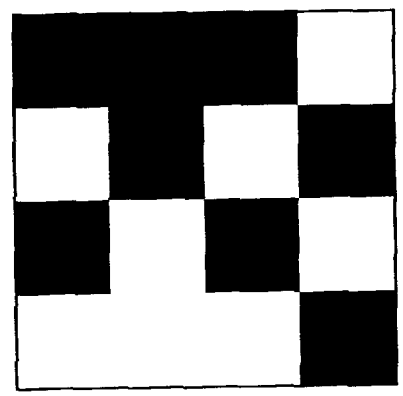
Figure 12C:
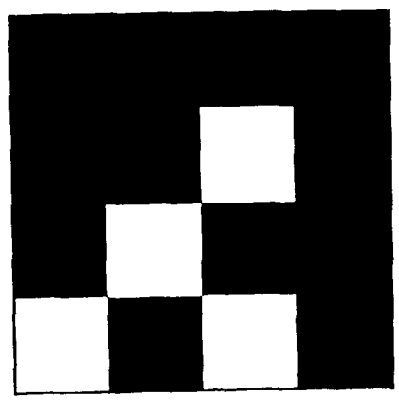

Consequently, an image pattern in which the average contrast potential is substantially the same and the contrast potential between pixels does not greatly deviate from the gradations before and after it can be found out from this simulation. That is, at the gradations wherein the contrast potential between pixels changes greatly (gradation levels 4, 8 and 12 as shown in FIG. 5), such patterns as shown, for example, FIGS. 12A, 12B and 12C have been adopted by the above-described simulation.

Figures 13, 14:
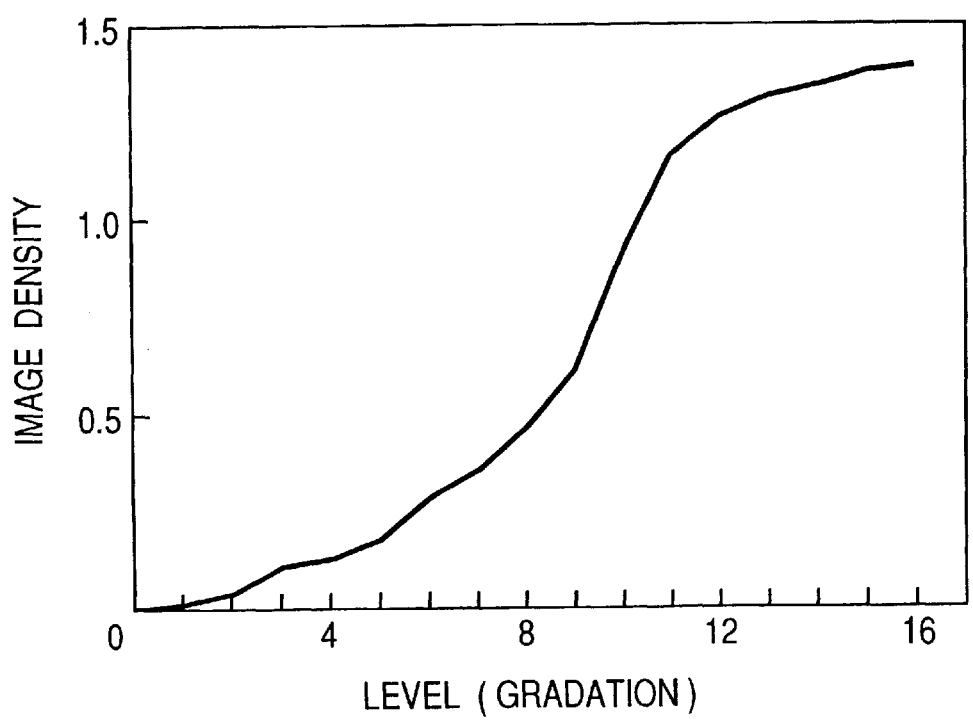
FIG. 13 shows a corrected dither pattern in Embodiment 1.
FIG. 14 is a graph showing the measured value of corrected gradation image density in Embodiment 1.

With the adjustability to each gradation taken into account, the image data processing apparatus 8 changes the gradation pattern shown in FIG. 25 to a gradation pattern shown in FIG. 13 and processes the input image data into electrostatic latent image data. As the result, as shown in FIG. 14, the image density (contrast) is not reversed at each gradation and a high gradation property could be obtained from a low density portion to a high density portion.

Further, the area gradation property is not at all changed and the average contrast potential is not greatly moved from among the simulations of various patterns obtained in the present embodiment, and the gradation of the contrast potential between pixels is corrected, whereby the average potential and the measured value of the image density can be improved.

[Embodiment 2]

In this embodiment, description will be made of the correction of image density, when an image forming apparatus similar in construction to Embodiment 1 is used and an eddy type dither pattern in used.

Figure 15:
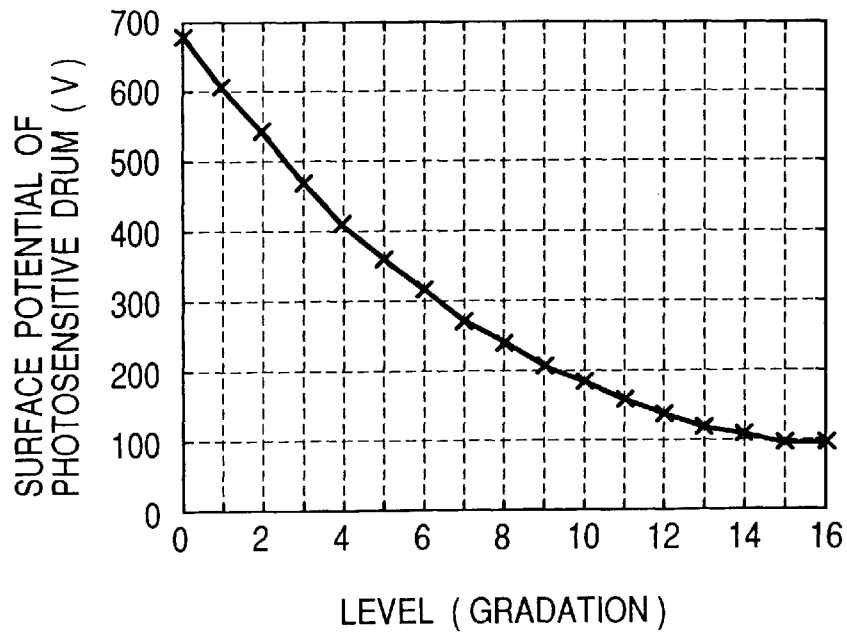
FIG. 15 is a graph showing the surface potential of the photosensitive drum at each gradation in the case of an eddy type dither pattern in Embodiment 2.
Figure 16:
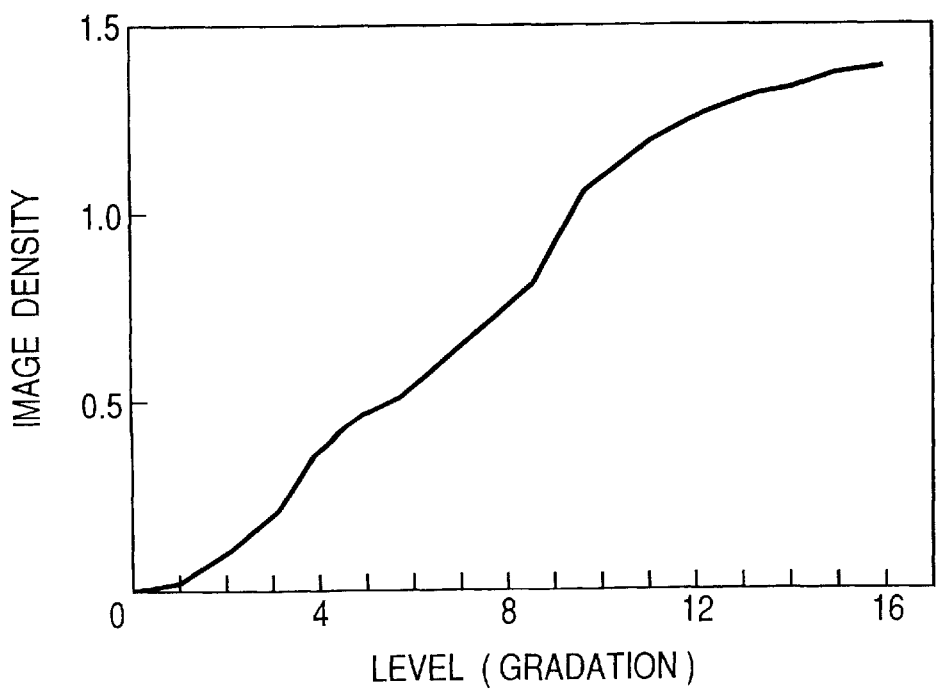
FIG. 16 is a graph showing image density at each gradation in the case of the eddy type dither pattern in Embodiment 2.
Figure 17:
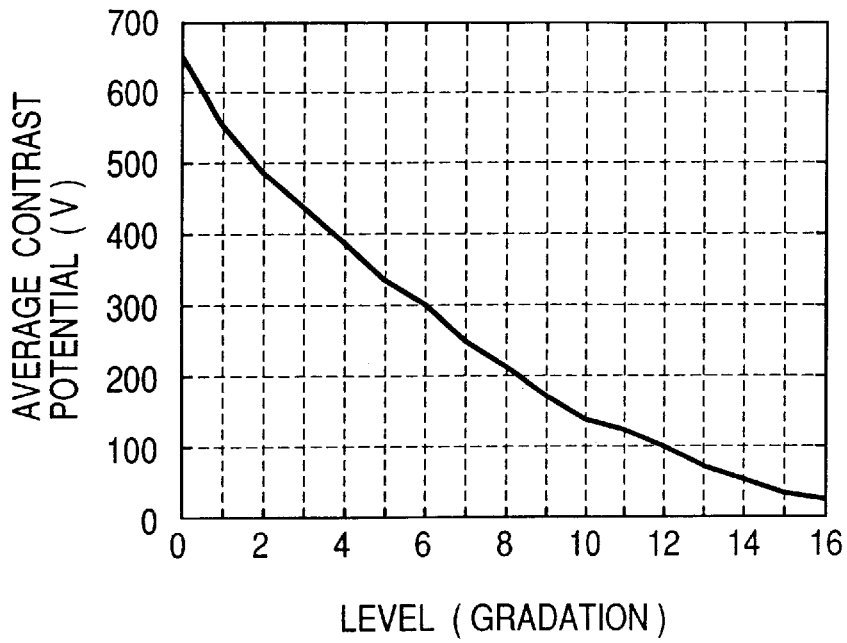
FIG. 17 is a graph showing the average contrast potential by a simulation in Embodiment 2.
Figure 18:
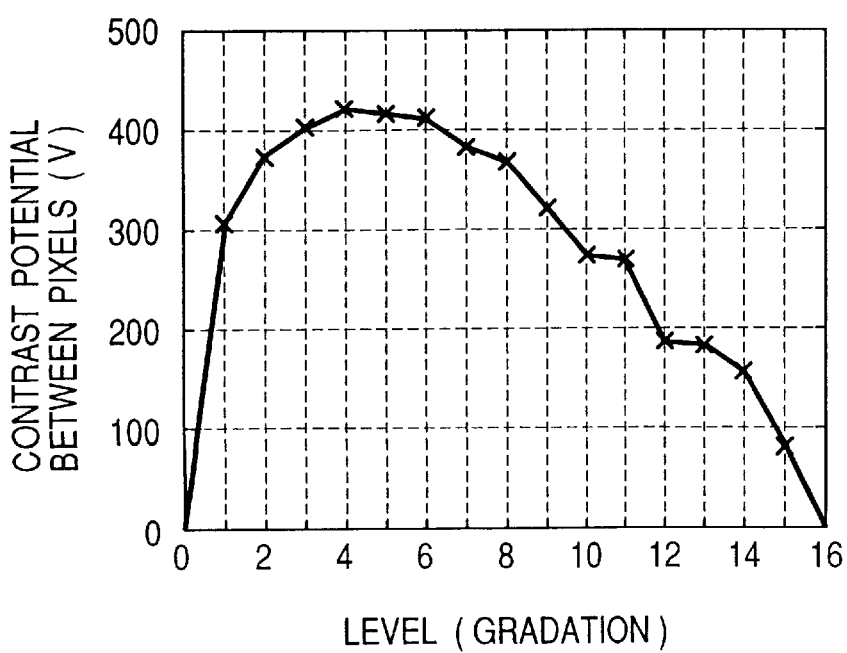
FIG. 18 is a graph showing the contrast potential between pixels by the simulation in Embodiment 2.

FIGS. 15 and 16 show the surface potential and image density, respectively, of the photosensitive drum at each gradation in the case of an eddy type dither pattern. FIGS. 17 and 18 show the average contrast potential and the contrast potential between pixels, respectively, by the above-described simulation.

From these figures, it will be seen that in the eddy type dither pattern, the image is generally a little crushed (is developed to a size a little larger than the actual pixels and the image density becomes too high) from gradation levels 4 and 5 at which the contrast potential between pixels is great to a high density portion.

Figures 19, 20, 21:
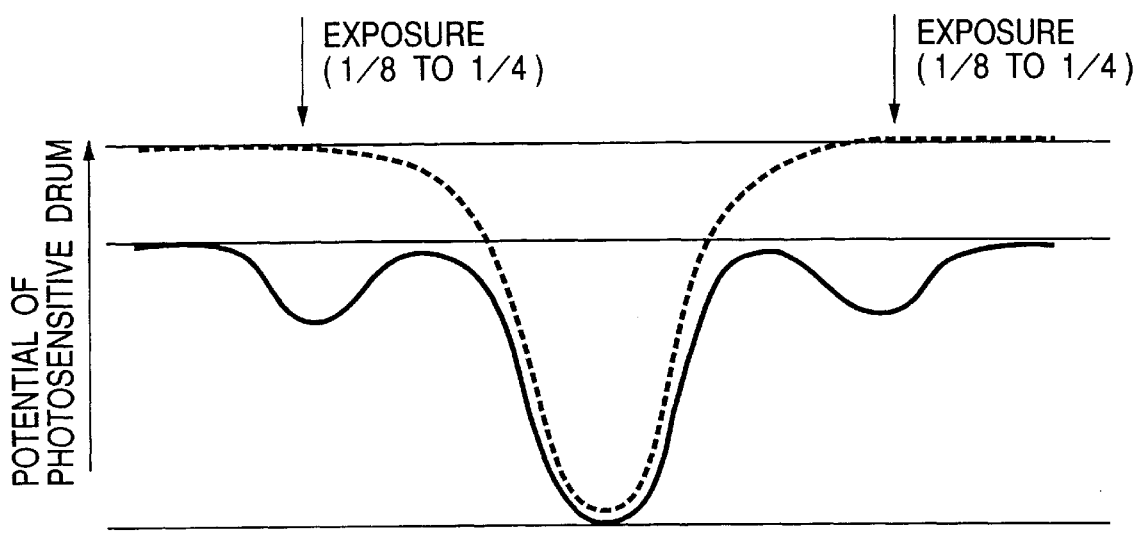
FIG. 19 is a graph illustrating a small amount of exposure being effected on the pixel of a non-image portion.
FIG. 20 shows exposure adjustment in Embodiment 2.
FIG. 21 shows a threshold matrix in the case of an eddy type dither pattern in Embodiment 2.

In this case, with the gradation level 5 at which the contrast between pixels is high as the center, as shown in FIG. 19, a small amount of exposure was effected on the pixels of a non-image portion (the positions indicated by arrows in FIG. 19) and the surface potential of the photosensitive drum was lowered to thereby effect the adjustment of the contrast potential between pixels. For example, the adjustment of the exposure amount at the time of gradation level 4 is such as shown in FIG. 20. Also, FIG. 21 shows the threshold matrix of the eddy type dither pattern. From this, it will be seen that four central pixels are chosen at the gradation level 4.

In the case of FIG. 20, the chosen pixels are represented as "1". As the exposure of the non-image portion, exposure corresponding to ⅛ of a pixel was effected on the surrounding remaining twelve pixels. By effecting such a small amount of exposure on the non-image portion, the fluctuation of the contrast potential between levels (gradations) could be suppressed. Also in the vicinity of the levels (gradations) 1 to 8, the fluctuation of the size of dots became small and the linearity of the reproduced image density was improved.

Also, as regards the small amount of exposure in this case, ⅛ to ¼ of the exposure amount for a pixel can obtain an effect. An exposure light amount smaller than 1/16 could obtain no effect. Also, for an exposure light amount greater than ½, there was found a fogged image in the non-image portion.

Accordingly, it is preferable that the exposure amount of the non-image portion for adjusting the contrast potential between pixels be set to a range of exposure amount greater than 1/16 and smaller than ½ of the exposure amount for completely exposing a pixel. Also, in this case, for the adjustment of the exposure amount, either of the intensity modulation system and the time modulation system may be used as a method of adjusting the exposure amount of a semiconductor laser.

[Embodiment 3]

In this embodiment, description will be made of a case where image formation is effected by the use of an image forming apparatus similar in construction to Embodiment 1 and an image writing in pixel dot growth gamma table.

Figures 22, 23:
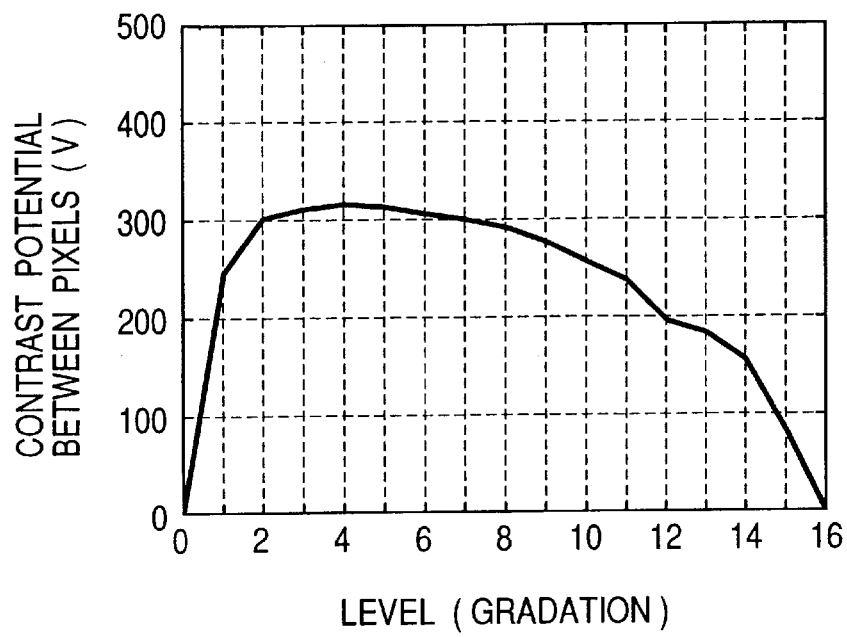
FIG. 22 is a graph showing the contrast potential between pixels corrected by the simulation in Embodiment 2.
FIG. 23 shows a pixel dot growth gamma table in Embodiment 3.
Figure 26:
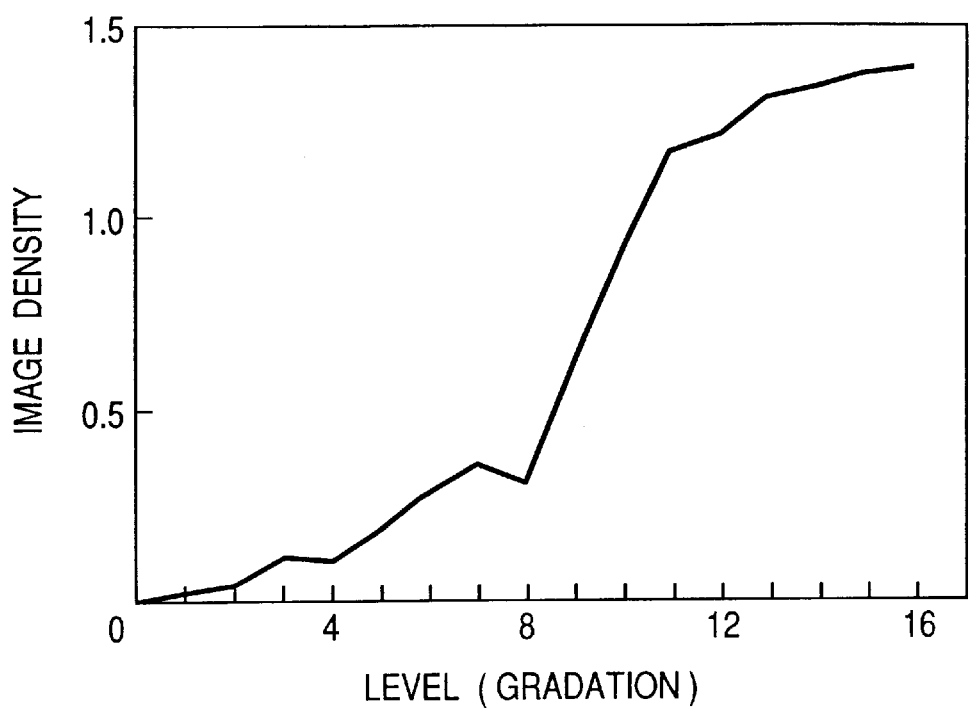
FIG. 26 is a graph showing the gradation image density of an image by the bayar pattern.
Figure 27:
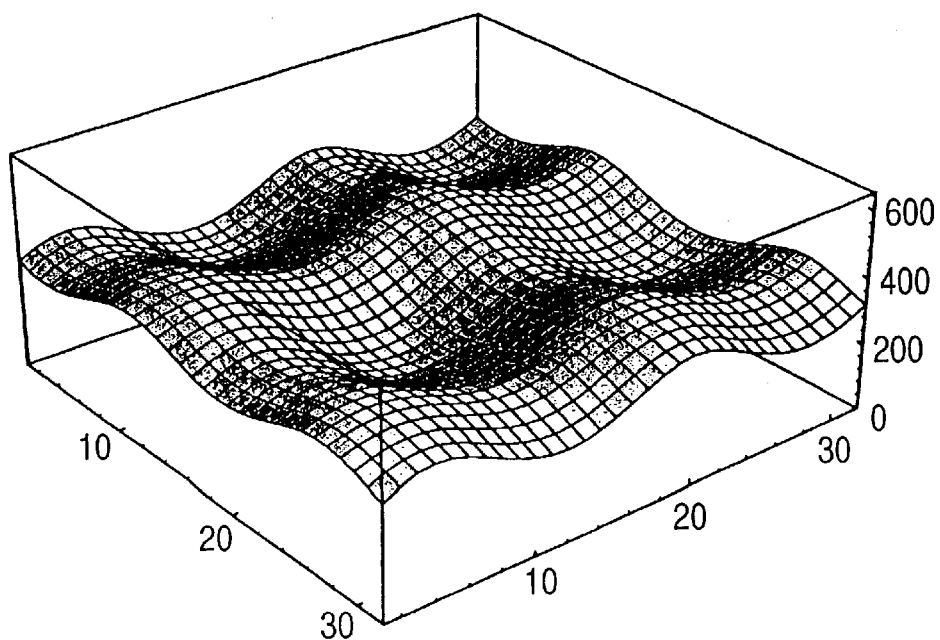
FIG. 27 shows the surface potential distribution of the photosensitive drum by the simulation of the level (gradation) 4 of the bayar pattern.
Figure 28:
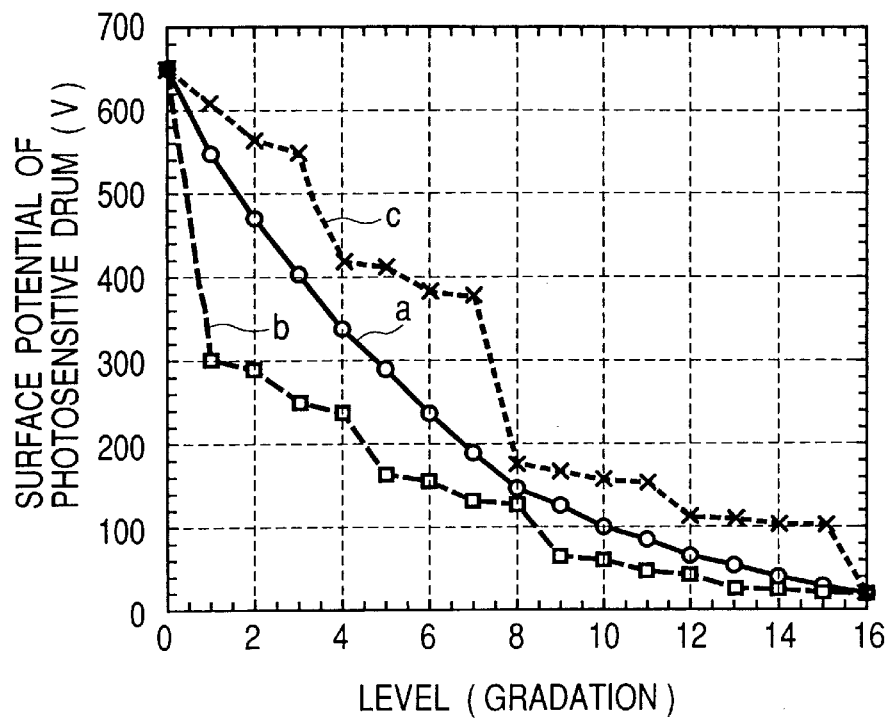
FIG. 28 is a graph showing the surface potential distribution of the photosensitive drum by the simulation of the level (gradation) 4 of the bayar pattern.
Figure 29:
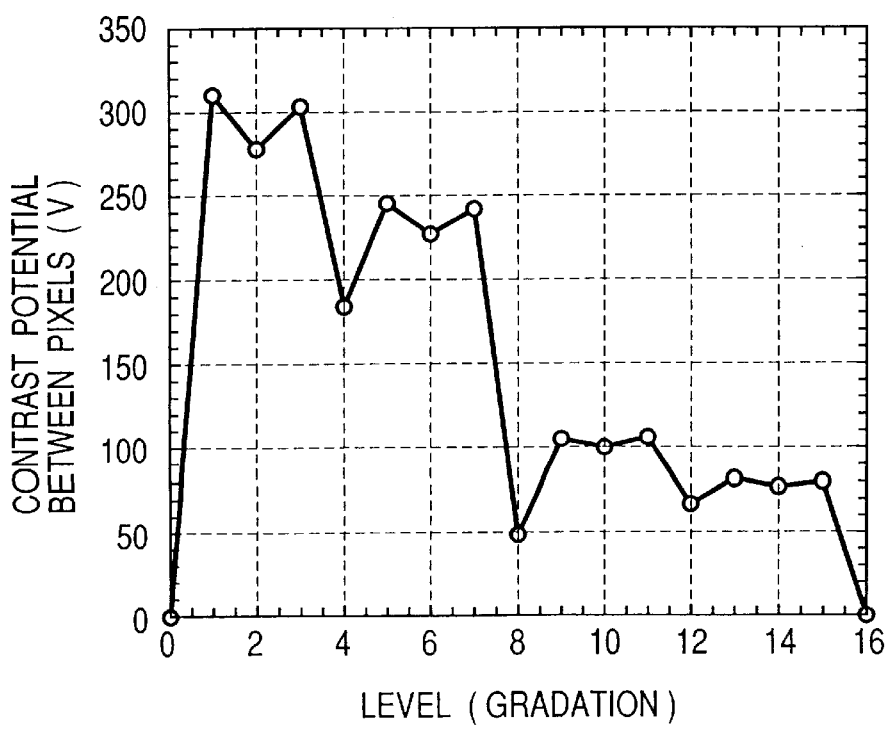
FIG. 29 is a graph showing the contrast potential between pixels found from the surface potential distribution of the photosensitive drum by the simulation of the level (gradation) 4 of the bayar pattern.

A dot creating method will hereinafter be described with reference to FIG. 23. The screen shown is a 4×4 pixel matrix, density data per pixel is "1", the density of the entire matrix is "16", and up to 4/16 of matrix image density data is dispersed in a group (a), up to 12/16 is dispersed in a group (b), and the remainder is dispersed in a group (c) (this case is called the 4-8-4 type).

Specifically, when the matrix image density is 1/16, density data of ¼ each is imparted to the four pixels marked as (a). Since there are four pixels of pixel density data ¼, the pixel density is 1 in total. Thus, the matrix image density 1/16 is reproduced.

As specific examples, the examples of the image pattern at the levels of pixel density data 2/16, 4/16, 6/16, 8/16 and 10/16 are shown in FIGS. 24A to 24E, respectively.

Now, in the above-described Embodiment 2, in the exposure to the non-image portion, it was possible to make the contrast potential between pixels which is the potential difference between the potential of a pixel and the potential of the pixels around it smaller, but in this case, the average contrast potential was sometimes changed. On the other hand, as in the present embodiment, by using the "image writing-in pixel dot growth gamma table", it has become possible to control the average contrast potential and the contrast potential between pixels independently of each other, and it has become possible to make the width and pattern of control markedly large.

As described above, according to the present invention, when input image data are to be processed into an electrostatic latent image, image calculation taking into account the mutual action around a pixel forming the electrostatic latent image is effected in conformity with the size of the pixel, whereby image formation of a high gradation property taking the interference between pixels into account can be accomplished.

What is claimed is:

1. An image forming apparatus for forming an image by digital processing comprising:

an electrophotographic photosensitive member for bearing an electrostatic latent image formed thereon;

image data processing means for processing input image data to a main body of the apparatus into data for forming the electrostatic latent image;

electrostatic latent image forming means for forming the electrostatic latent image on the electrophotographic photosensitive member by affecting image exposure by digital optical means conforming to the electrostatic latent image data; and developing means for developing the electrostatic latent image with a toner to thereby form a developed image;

wherein the image data processing means effects an image calculation taking into account mutual action around a pixel constituting the electrostatic latent image in conformity with the size of the pixel when it processes the input image data into the electrostatic latent image data, and wherein the potential distribution of an image portion formed by the electrostatic latent image of a dither gradation pattern when the electrostatic latent image is formed by the dither gradation pattern is calculated by the image calculation taking into account the mutual action around the pixel by the image data processing means, and the dither gradation pattern is changed on the basis of the average potential of the potential distribution of the image portion found from the calculation, the average contrast potential which is the potential difference between developing bias potential applied to the developing means and the surface potential of the electrophotographic photosensitive member, and pixel contrast potential which is the potential difference between the potential of the pixel and the potential of the pixels around it.

2. An image forming apparatus for forming an image by digital processing comprising:

an electrophotographic photosensitive member for bearing an electrostatic latent image formed thereon;

image data processing means for processing input image data to a main body of the apparatus into data for forming the electrostatic latent image;

electrostatic latent image forming means for forming the electrostatic latent image on the electrophotographic photosensitive member by affecting image exposure by digital optical means conforming to the electrostatic latent image data; and developing means for developing the electrostatic latent image with a toner to thereby form a developed image;

wherein the image data processing means effects an image calculation taking into account mutual action around a pixel constituting the electrostatic latent image in conformity with the size of the pixel when it processes the input image data into the electrostatic latent image data, and wherein the potential difference between the potential of the pixel in a non-image area portion and the potential of pixels around it is made smaller by the image calculation taking into account the mutual action around the pixel by the image data processing means.

3. An electrophotographic apparatus comprising:

a photosensitive body;

electrostatic image forming means for forming an electrostatic image on said photosensitive body, wherein said electrostatic image forming means including image exposing means for image-exposing said photosensitive body in accordance with an image data; and developing means for developing the electrostatic image with toner;

wherein when said image exposing means exposes said photosensitive body so that a predetermined part of a pixel in a dither matrix becomes an image portion, said image exposing means exposes a pixel of a residual non-image portion in the dither matrix with an exposing amount being $1/8$ to $1/4$ the exposing amount for the pixel of the image portion.

4. An electrophotographic apparatus according to claim 3, wherein a potential difference between a highest potential and a lowest potential in the dither matrix becomes greater up to a predetermined density level and becomes smaller when exceeding the predetermined density level.

5. An electrophotographic apparatus comprising:

a photosensitive body; and electrostatic image forming means for forming an electrostatic image on said photosensitive body, wherein said electrostatic image forming means including image exposing means for image-exposing said photosensitive body in accordance with toner;

wherein said image exposing means can expose dividedly plural pixels evenly in one density level so that a center of balance of the density is present at a center of a dither matrix regardless of a density level in the dither matrix.

* * * * *

UNITED STATES PATENT AND TRADEMARK OFFICE
CERTIFICATE OF CORRECTION

PATENT NO. : 6,226,019 B1
DATED : May 1, 2001
INVENTOR(S) : Masao Nakano

Page 1 of 1

It is certified that error appears in the above-identified patent and that said Letters Patent is hereby corrected as shown below:

Column 4,
Line 45, "in" should read -- is --; and
Line 46, "in" should read -- is --.

Column 5,
Line 22, "in" should read -- has --.

Column 6,
Line 11, "after" should read -- after being --.

Column 8,
Line 36, "affecting" should read -- effecting --.

Column 9,
Line 6, "affecting" should read -- effecting --.

Signed and Sealed this

Twenty-ninth Day of January, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,226,019 B1
DATED : May 1, 2001
INVENTOR(S) : Masao Nakano

It is certified that error appears in the above-identified patent and that said Letters Patent is hereby corrected as shown below:

<u>Title page,</u>
Item [30], Foreign Application Priority Data, "9-359006" should read -- 9-359066 --.

Signed and Sealed this

Twenty-second Day of October, 2002

Attest:

Attesting Officer

JAMES E. ROGAN
*Director of the United States Patent and Trademark Office*